United States Patent
Weaver et al.

[11] 3,712,143
[45] Jan. 23, 1973

[54] DIFFERENTIAL PRESSURE RESPONSIVE APPARATUS

[75] Inventors: John A. Weaver, Philadelphia; Carl Raymond Brandt, Fort Washington; Lester R. Leidy, Jr., Oreland, all of Pa.

[73] Assignee: Honeywell Inc., Minneapolis, Minn.

[22] Filed: Dec. 21, 1971

[21] Appl. No.: 210,365

[52] U.S. Cl. ............................... 73/407 R, 73/398 AR
[51] Int. Cl. ............................... G011 7/08, G011 9/04
[58] Field of Search ........ 73/407 R, 398 AR, 85.5 SD

[56] References Cited

UNITED STATES PATENTS 3,058,350  10/1962  Brown ................................. 73/407 R
3,313,158  4/1967  Di Giovanni ........................ 73/407 R

*Primary Examiner*—Donald O. Woodiel
*Attorney*—Arthur H. Swanson et al.

[57] ABSTRACT

A unique construction for improving the compactness, accuracy, stability, reliability and sensitivity of fluid filled meters employed to transduce a differential fluid pressure measurement into an electrical signal before, during and after the existence of an abnormal overload condition on the high or low fluid pressure side of the meter by employing:

1. A wafer supported on a stationary body portion of the meter which is made of a single crystal silicon material having a diffused - fully active resistive bridge pattern thereon to sense the differential pressure that is applied to the wafer.
2. A motionless electrical connection between the diffused - fully active, resistive bridge on the wafer and a power transmitting current outside said meter.
3. A flexible compliance bellows connected in compact parallel relationship with a bellows actuated overload valve for (*a*) preventing an indicator measuring the magnitude of the differential pressure under measurement from erroneously indicating that the measurement is at an on scale valve when in fact it is at a dangerous over scale valve and retaining the differential pressure acting sensor during a high or low pressure overload condition within a desired pre-selected pressure range so that the wafer and resistive bridge cannot be impaired as an overload fluid pressure is applied to the meter.

11 Claims, 6 Drawing Figures

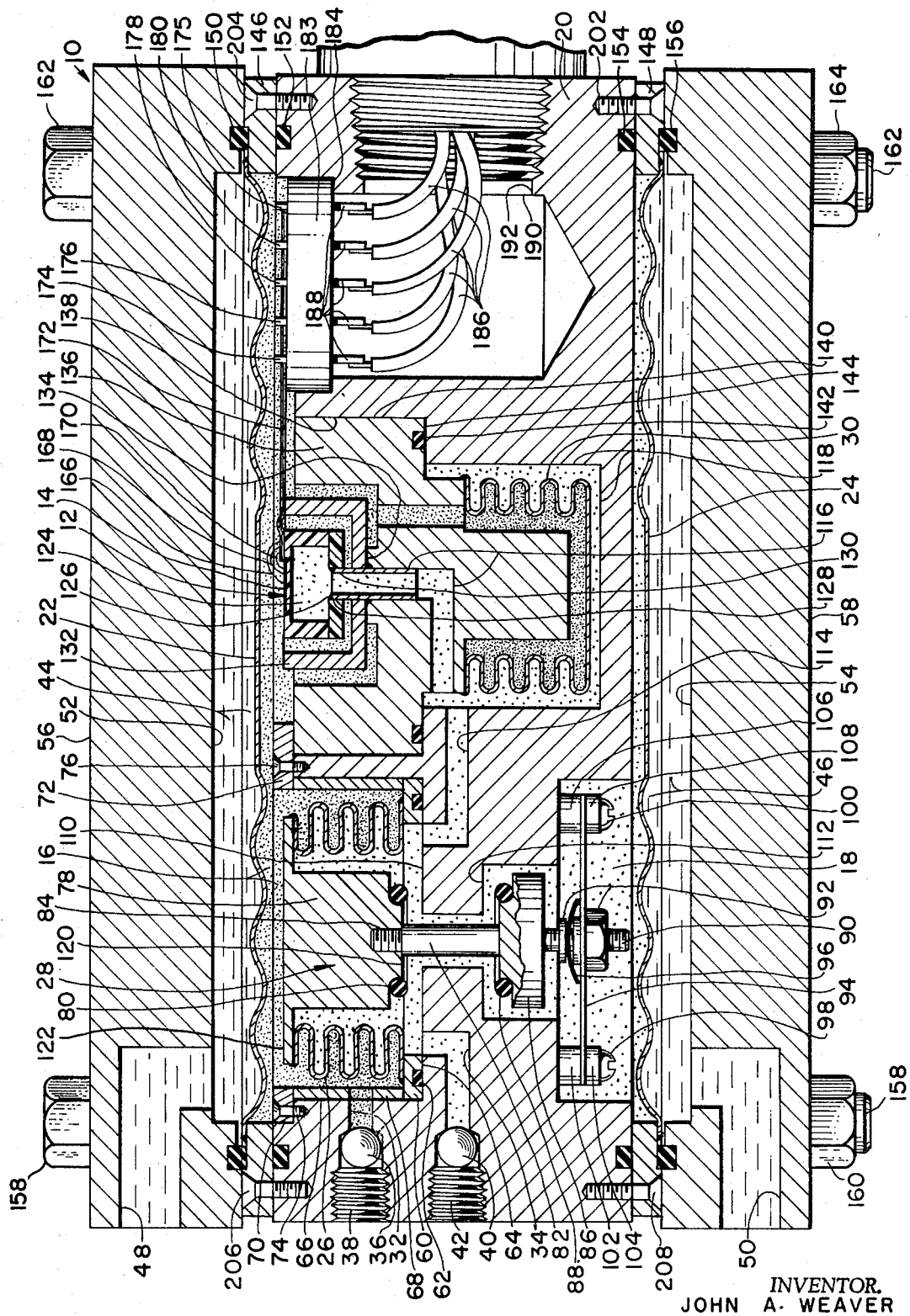

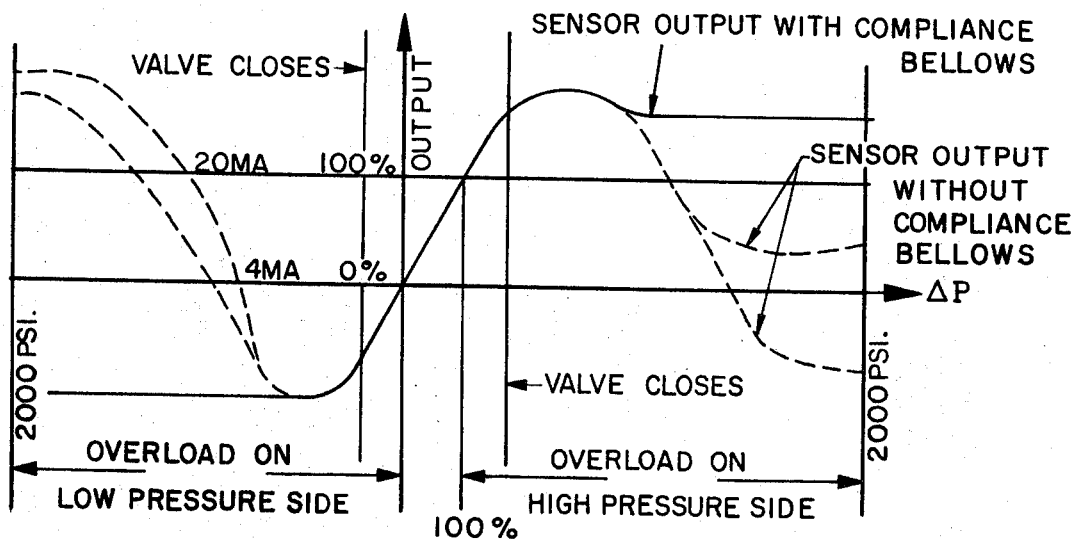
FIG. 6
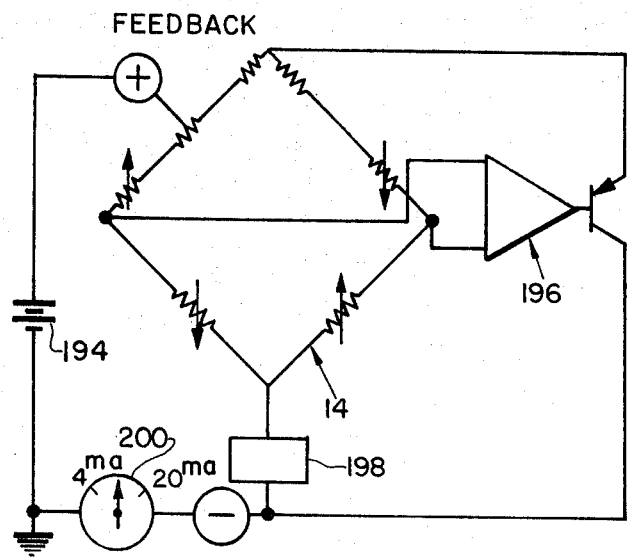
FIG. 5
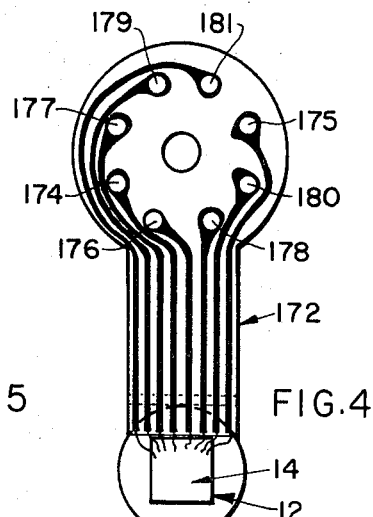
FIG. 4
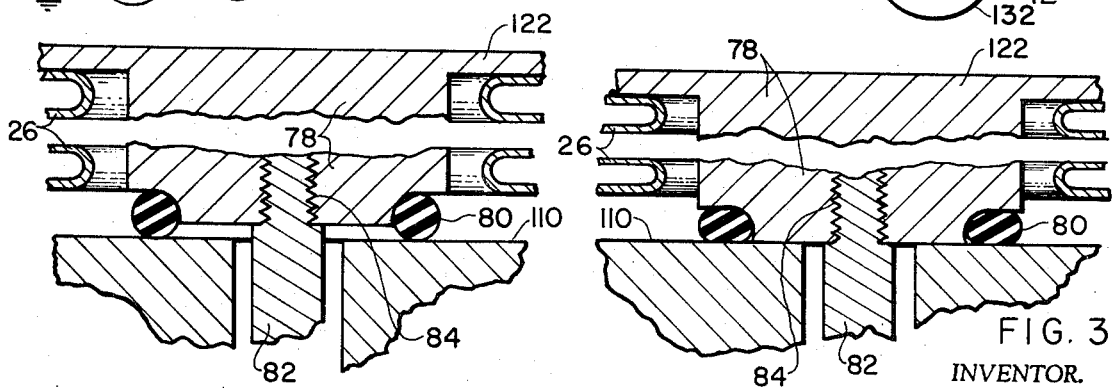
FIG. 2
FIG. 3
INVENTOR.
JOHN A. WEAVER
CARL RAYMOND BRANDT
LESTER R. LEIDY JR.
BY
John Shaw Stevenson
AGENT

DIFFERENTIAL PRESSURE RESPONSIVE APPARATUS

BACKGROUND OF THE INVENTION

The aforementioned invention can be beneficially employed in a differential pressure to current transmitter which is of the general type such as that covered by U.S. Pat. No. 3,559,488 granted to John A. Weaver on Feb. 7, 1971.

In the aforementioned patent a strain gage sensor is mounted on a moveable end of a differential pressure sensing bellows and fine wires extend between the strain gage sensor and the stationary portion of the meter body through which an electrical signal representative of these changes is transmitted.

PROBLEMS

As changes take place in the magnitude of the differential pressure being applied to the end plate of the bellows that is employed in the aforementioned patent, the thin wires connected to the moving end of this bellows will be flexed. This flexing action could cause the wires to fray and expensive down time must be spent in opening the meter, replacing the broken wires, and in soldering replacement wires to the movable ends of the bellows.

Another problem that has been encountered with the meter disclosed in U.S. Pat. No. 3,559,488 is that when a differential pressure signal is being converted into a proportional electrical output signal it erroneously indicates that the valve of the signal under measurement is within its normal operating scale valve where in fact it is at a dangerous over scale valve.

Another problem encountered in present day meters of the aforementioned type is that users of such meters are requiring them to have jewel parts, to be reliable, more compact, lighter, accurate and stable than meters heretofore available.

SUMMARY OF THE INVENTION

One solution that has been found to eliminate the aforementioned problems is to employ a semi-conductive wafer having a resistive bridge diffused in a doped piezoresistive pattern thereon as the sensor to sense changes occurring in the difference between separate high and low fluid pressures that are applied to the opposite sides of this wafer.

Since a negligble amount of motion will occur in the sensor when the separate high and low fluid pressures are applied to its opposite sides, no flexing will occur in the electrical signal transmitting wire or wires that are attached to such a sensor because they are not connected to the active region of the sensor.

The present invention makes maximum use of the space within the meter by mounting the bellows operated overload valve and the aforementioned compliance bellows in parallel relationship with one another so that a joint movement can take place in these bellows as will hereinafter be described in detail.

Another desirable feature evolving from the use of a compliance bellows in the aforementioned uniquely constructed meter is that it will always provide a correct output signal indication when an overload pressure condition is present in either the low or high fluid pressure side of the meter. Without the presence of a compliance bellows differential pressure measuring meters have heretofore been known to provide false output indications which would lead the operator to believe that the differential pressure he was measuring was in a normal operating range, where, in fact, a dangerous condition existed in which the fluid pressure on either the high or low side of the meter had reached an overload condition.

BRIEF DESCRIPTION OF THE DRAWINGS

A better understanding of the present invention may be had when the following detailed description is read in connection with the accompanying drawings in which:

FIG. 1 shows a sectional view taken through the differential pressure sensing meter;

FIG. 2 shows the overload bellows in its initial fluid sealing off overload condition;

FIG. 3 shows the overload bellows in its final overload fluid shutoff condition;

FIG. 4 shows a plan view of how a flexible electrical connection is employed to connect an outside electrical power source that is external to the meter through a fluid tight wall to a piezoresistive differential pressure sensor located within the meter;

FIG. 5 shows the electrical bridge employed to produce an electrical signal that is responsive to the magnitude of the differential fluid pressure under measurement; and FIG. 6 shows a graph to indicate why a compliance bellows is necessary and how an erroneous narrow measurement in the high or low differential pressure measurement could be indicated when in fact the measured differential pressure was at an undesired overload pressure level, if such a compliance bellows is not used.

A DETAILED DESCRIPTION

FIG. 1 shows a pressure sensing apparatus 10 having a pressure sensor 12 that is a wafer made of single crystal silicon material unto which has been diffused a fully active resistive wheatstone bridge pattern 14.

A high pressure fluid 16 and low pressure filled fluid 18 both of which are in the form of an incompressible nonconductive liquid are shown retained within the body 20 of the meter 10 and between high and low barrier diaphragms 22, 24 that are matched in size and stiffness to minimize the affect of temperature and static pressure.

The aforementioned fill fluid 16, 18 are shown positioned to apply fluid pressures that are in opposition to one another to opposite sides of the pressure sensor 12 and to opposite sides of a flexible overload bellows 26 which forms a portion of the high pressure overload valve 28.

The aforementioned filled fluids 16, 18 are also shown applying pressures that are in opposition to one another to opposing sides of the overload compliance bellows 30.

Ports 32, 34 shown on the left side of the body 20 are provided through which the aforementioned filled fluids 16, 18 are applied to fill the interior of the meter 10 while air is evacuated from the meter 10.

After filling the meter 10 with the filled fluid 16, 18 ball seal and plug units 36, 38; 40, 42 are then inserted into the outer ends of the ports 32, 34 of the body 20 to completely seal off the fill fluids retained within the interior of the meter 10 from atmospheric pressure.

High and low process fluid pressures 44, 46 whose differential pressure is to be measured are applied by way of their respective passageways 48, 50 and chambers 52, 54, formed by the high pressure heads 56, 58 and their separately associated diaphragms 22; 24.

The outer open end of the flexible bellows 26 of the high pressure overload valve 28 is shown fixedly connected, for example, by a solder to the inner wall of the ring shaped spacer 60. The lower flat surface of this ring 60 is retained in fixed relation with an O-ring seal 62 and a surface forming the base 64 of a cylindrically bored out, aperture wall 66 formed in the body 20 of the meter 10 by means of a sleeve shaped spacer 68 and associated retainers 70, 72.

These retainers 70, 72 are shown fixedly connected to the top portion of the body 20 by means of threaded screw connections 74, 76.

The closed end of the overload bellows 26 has a cylindrical T-shaped block 78 extending downwardly therefrom and has a resilient O-ring 80 retained in protruding relationship therewith at its lower end.

The lower portion of this overload valve 28 has a rod 82 that protrudes in an upward direction in spaced apart relationship through a passageway 84 formed in the body 20 of the meter 10. The upper end of the rod 82 is shown threadedly connected at 84 to the center of the lower portion of the cylindrical block 78 for joint movement therewith.

A cylindrical block 86 forms an integral central portion of the rod 82 which has a resilient O-ring 88.

The lower end of the rod 82 has a threaded end portion 90 on which there is threadedly mounted a hub portion 92. An S-shaped spring 94 is mounted on the hub portion and held in fixed relation thereon by means of a cup shaped spring washer 96. This washer 96 is of the type having a radial slot for rapid assembly into the position as shown in FIG. 1. The outer ends of this S-shaped spring 94 are retained by means of two screw threaded connections 98, 100 and associated spacers 102, 104; 106, 108.

When the head part of hexagonal hub portion 92 is rotated in one direction, it will cause the O-ring 80 and the parts associated therewith to be moved to an adjustably fixed operating position in a downward direction from the position shown and when it is rotated in the opposite direction it will cause the O-ring 80 to be moved to a different adjustably fixed operating position in an upward direction from the position shown.

The aforementioned adjustment is for the purpose of allowing an operator to select the pressure level at which either the overload high or low pressure fluid under measurement 44, 46 and its associated fill fluid 16 or 18 can close the overload valve 28.

During a normal non-overload condition the O-rings 80 and 88 will remain in spaced apart relation with respect to their associated seats 110, 112.

During one abnormal high pressure overload condition the pressure of the high pressure fluid 44 under measurement is raised to an abnormally high pressure level that is beyond the normal high pressure operating range of the meter 10.

This abnormal increase in the pressure of the high pressure fluid 44 is applied to the high pressure barrier diaphragm 22, to the filled liquid 16 and to the overload bellows 26. This action will cause the bellows 26 and the block 78 attached to the upper end of the bellows 26 and the O-ring 80 connected thereto to move in a downward direction until the O-ring 80 is brought into an initial substantially non-deformable seal tight contact with the seating surface 110 as is best shown in FIG. 2.

This initial sealing action traps a portion of the low pressure fill fluid 18 under the sensor 12 inside bellows 26, passageway 34, 114, 116 and between the bored out cylindrical wall 118 and the outer wall of the compliance bellows 30. The pressure of the trapped volume of the relatively incompressible fluid 18 is therefore initially raised to effect a lowering of the differential pressure acting across the sensor 12 as the initial abnormal change in the high pressure fluid 44 and the high pressure fill fluid occur. This pressure negating action thus prevents the increase of the high pressure fill fluid 16 from rupturing the semiconductor sensor 2.

During the movement of the overload valve 28 from the substantially non-compressed sealed position of the O-ring 80 shown in FIG. 2 to the compressed sealed position of O-ring 80 shown in FIG. 3 a reduction in the volume of the trapped low pressure fluid fill 18 that is within the overload bellows 26 will take place. Under this latter mentioned condition the magnitude of the pressure of the high pressure fluid 44 and the high pressure fluid 16 is sufficiently high to cause the overload bellows 26 to be compressed and its associated block on which the O-ring 80 is mounted to move in a downward direction and the O-ring to be deformed into the shaped as shown in FIG. 3. FIG. 3 also shows that the base portion 120 of the metal block 78 under the latter mentioned condition is seated against the metal seating surface 110 of the body 20. While the aforementioned compression of the bellows and O-ring seal 80 takes place, a decrease in the volume of the low pressure liquid fill 18 within the overload bellows 26 will also occur as the overload bellows, including its solid cylindrical end portion 122, is moved in a downward direction in a piston-like manner. This piston-like effect occurs during the downward movement of the bellows and while its convolutions are being brought into more compact relationship with one another as shown in FIG. 3.

More specifically, it should be noted that while the O-ring 80 is being squeezed and it is simultaneously moved between the positions shown in FIG. 2 and FIG. 3, the top of the bellows will move the same distance as the amount of this O-ring 80 is squeezed, since these parts are rigidly connected. It should further be noted, since the area of the bellows 26 is greater than that of the O-ring 80, a change in the volume of the trapped fluid results. This change in volume would normally cause an excessive change in pressure, but this is prevented by the compression of the compliance bellows 30.

The semiconductor sensor 12 is shown forming the top wall of an enclosed chamber 124. A conduit 126 forming an inner wall of the passageway 116 is connected in fluid seal tight relationship at 128 to an associated wall forming a port 130 in the base of the chamber 124.

The conduit 126 extends through a cylindrical, wafer protecting, ceramic chassis 132 that surrounds and is spaced from the cylindrical chamber 124. The ceramic chassis 132 is connected by an epoxy fluid sealing cement to conduit 126 and to the upper embossed portion 134 of the wafer and compliance bellows support block 136.

The outer peripheral surface 138 of the support block 136 is of a cylindrical shaped configuration so that the sensor unit 12 including chamber 124 and the compliance member 30 mounted on the block 136 can be easily slid along the cylindrical bored out wall 140 formed in the meter body 20 and into the position shown in FIG. 1.

When it is in this latter mentioned position the O-ring 142 will be held in fluid tight relationship with the base surface 144 by a suitable number of retainer plates and screw connections, for example, 72, 76 which are spaced about the upper end of this block 136.

It should be noted that the two heads 56, 58, the centrally located body 20 and the support plates 146, 148 to which the barrier diaphragms 22, 24, are fixedly attached are of a substantially square shaped configuration.

Furthermore, the heads 56, 58, body portion 20 and support plates 146, 148 are connected in fluid seal tight relationship with one another as a single unit by means of suitable O-ring seals 150, 152, 154, 156 and with the aid of a suitable number of bolt and nut connections, for example, 158, 160; 162, 164.

It should also be noted that a suitable number of fine wires, for example, 166, 168, 170 are connected as jump wires to an electrical head frame 172 between the active resistive bridge 14 formed on the silicon semiconductor wafer 12 and upper multi-pin connections 174, 175, 176, 177, 178, 179, 180, 181 of a cylindrical feed through header 183, this headed 183 in turn is shown in sealed fluid tight engagement with the cylindrical bored out wall 184 formed in the body 20.

Additional leads 186 which may be mounted in the form of another flexible cable are connected to the lower multi-pin connections 188 of the feed through member 183 and passing downwardly through the cylindrical bored out portion 190 in the body 12 and extending outwardly through a cylindrically bored out port 192 formed on the right side of the body 12.

FIG. 5 shows that the fully active resistive wheatstone bridge pattern 14, previously referred to under description of FIG. 1, receives power from a power source 194 that is external to the meter 10 shown in FIG. 1.

FIG. 5 also shows that an output of the temperature compensated amplified unit 196 and the constant current regulator 198 is provided for the bridge 14 that is external to the meter 10.

A more thorough detailed description of the amplifier unit 196 and how it is interrelated with the output of the strain gage bridge 14 to provide temperature compensation can be obtained by referring to the Anthony M. Demark Pat. application Ser. No. 62,868 filed Aug. 11, 1970.

An electric ammeter 200 is employed in the output of the bridge circuit 14 for indicating changes in the magnitude of the differential pressure being applied across the pressure sensor 12 as shown in FIG. 1 in terms of electrical units, for example, 4 to 20 milliamp which is equivalent to the 0 to 100 percent operating range that is selected for the meter 10.

FIG. 6 shows the 0 – 100 percent scale value or 4 to 20 milliamp scale value that will appear on meter 200 of FIG. 5 when the differential pressure being applied to the active resistive wheatstone bridge pattern 14 on pressure sensor 12 is operating within the normal operating conditions.

It can be seen from FIG. 6 that if the previously described pressure of the high pressure fluid 44 and its related high pressure fill fluid 16 attempts to exceed a normal operation pressure value the overload valve 28 will begin to move downwardly toward its closed position shown in FIG. 2 at the pressure level identified in FIG. 6 as the "valve closes" line on the right side of this FIG. 6.

As the pressure on the sensor 12 increases, the output of the sensor continues to increase until the uppermost point on the hump of the sensor output curve shown on the right side of FIG. 6 is reached and the overload valve 28 is completing its previously mentioned fluid compressing piston-like movement or in other words going from its FIG. 2 position to its FIG. 3 position.

It can be shown that if a compliance bellows 30 is not used, and an abnormally high fluid pressure 44 and its accompanying high fluid filled pressure 78 is present, then a meter measuring the output of the sensor would erroneously indicate that the meter 10 was being operated within the normal 0 – 100 percent scale range of the meter 10 or operating at a level which is below this range. Two examples of these conditions are shown in dash line form at the right side of FIG. 6 and are identified thereon as "sensor output without compliance bellows."

It can also be seen in a similar fashion to that just described in FIG. 6 that the compliance bellows 30 will enable a true reading to occur on the differential pressure measuring gage 200 only when the differential pressure being sensed by the sensor 12 is in fact within the normal 0 to 100 percent operating scale of the meter 10 as is shown in solid line form on the left side of FIG. 6. The dash lines on the left side of FIG. 6 show what can happen when an overload pressure condition on the low pressure side of the meter 10 occurs and no compliance bellows 30 is employed. In this regard it should be noted that these last mentioned dash lines would erroneously indicate to an operator that the value of the sensor output is in the normal operating range and at a range that is higher than the 100 percent operating range value rather than indicating that the true value of the overload pressure is in fact below the operating range of the meter 10 as is shown in the solid line form in the lower left portion of FIG. 6.

Since a compliance bellows 30 is provided when this overload pressure condition occurs, the output of the sensor 12 will remain above the 100 percent non indicating level as is indicated in solid line form shown to the right of the arrow which is identified as "sensor output with compliance bellows" in FIG. 6.

A suitable number of threaded connections which may be in the form of flat head machine screws, for example, 202, 204, 206, 208 are shown spaced about and passing through each of the support plates 146, 148 and body 20 to retain the high and low fill fluids 16, 18 in sealed fluid tight relationship between the barrier diaphragms 22, 24.

Therefore when the nut and bolt connections, for example, 158, 160; 162, 164 and the heads 56, 58 are removed from the external surface of the support plate 146, 148 the barrier diaphragms 22, 24 which have their peripheral portions welded to their associated support plates 146, 148 will form a unitary fluid tight unit. This unit in turn contains modular parts e.g., 136 that can readily be removed and replaced with another module. Such a meter construction affords a very rapid way in which the meter 10 can be repaired and therefore will reduce the downtime loss in production that is necessitated when such a repair is required.

The embodiments of the invention in which an exclusive property or privilege is claimed are defined as follows:

1. A transducer comprising a meter body, said meter body having cavities formed in two spaced apart walls thereof, a pair of opposed diaphragms each connected to a different one of said spaced apart walls and extending in spaced apart relationship over the cavities contained therein to form a fluid type cover for each of the opposite sides of the meter, a first flexible member forming a first chamber within a first one of said cavities, a second flexible member forming a second chamber within a second one of said cavities, said first and second chambers being adjacent to and spaced from a first one of said diaphragms, a sensing transducer having opposed surfaces and mounted for response within said meter body, passageways in said meter body to apply a first fluid under pressure within the space between said first one of said diaphragms and its associated meter wall to a first outer wall of said first flexible member to the inner wall of said flexible member and to one surface of said sensing transducer, and additional passageways to apply a second fluid under pressure within the space between said second diaphragm and its associated meter wall to the other opposite side of each of said flexible members and a second opposite surface of said sensing transducer, and an overload valve passing through a passageway containing said second fluid and connected for movement with said first flexible member, and wherein said chamber formed by said second flexible member is operable to relieve the pressure of either one of said fluids acting on said first flexible member and on said sensing transducer whenever the pressure of either of said fluids approaches an overload pressure condition.

2. A differential pressure responsive apparatus comprising a meter body, a wafer positioned within said meter body having a resistive sensing element thereon to sense changes occurring in a relatively high and low incompressible fluid pressure being applied thereto and to produce an electric output signal of a proportional magnitude, an overload valve having a soft and hard seat and positioned in a first chamber formed by a body portion of the meter, said overload valve being mounted for movement with a first flexible member from a soft seated position to a hard seated scaled off position with the meter body to cut off low pressure fluid on a low pressure side of said meter from being applied to said first flexible member during a condition in which said high incompressible fluid pressure approaches an overload pressure level, a flexible compliance member, a second chamber formed by another body portion of the meter and the external wall of said compliance member, passageways in said body for simultaneously applying said low incompressible fluid pressure being applied to the internal wall of said first flexible member and said wafer to the second chamber to compress the flexible compliance member and thereby maintain the low pressure fluid at a level that will not impair the sensing and transmitting characteristics of the semi-conductor wafer and its associated resistive sensing element.

3. The apparatus as defined in claim 2 wherein the wafer is of a single crystal silicon material in which said resistive sensing element is a doped piezoresistive pattern.

4. The apparatus as defined in claim 2 wherein the resistive sensor is comprised of a fully active wheatstone bridge pattern.

5. The apparatus as defined in claim 2 wherein a substantially motionless electrical connection extends between the resistive sensing element, through an electrical feed through member in the wall of the meter and to an electrical power transmitting circuit positioned outside the meter.

6. The apparatus as defined in claim 2 wherein the overload valve has a second soft and hard seat for engagement with a portion of said meter body similar to but in a direction opposite to the manner in which said first mentioned valve is closed whenever the magnitude of the low pressure fluid fill being applied to the inner wall of said first flexible member exceeds an overload pressure condition and causes said first flexible member to expand, the expansion of said first flexible member being accompanied by a corresponding compression of the flexible compliance member as said low overload incompressible fluid pressure is applied thereto.

7. The apparatus as defined in claim 2 wherein the wafer and its associated diffused resistive sensing element form a wall of a chamber in a block that in turn is held by a retaining means in fixed relation with the body of the meter so that the wafer, sensing element and block can be readily removed as a unit from said meter body.

8. The apparatus as defined in claim 2 wherein the wafer and its associated diffused resistive sensing element form a wall of a chamber in a block that in turn is held by a retaining means in fixed relation with the body of the meter so that the wafer, sensing element and block can be readily disconnected from the meter body and wherein the open end of said compliance bellows is fixedly mounted on and removable with said block from said meter.

9. The apparatus as defined in claim 2 wherein the overload valve is provided with a flat S-shaped spring whose outer ends are fixedly connected to the meter body and whose inner ends are connected to a movable portion of said valve and means on said movable portion of said overload valve for adjusting the position of the inner end of said spring and the amount of force which the spring can apply to said overload valve as it is being moved toward a fully opened and fully closed position and thereby provide a means for selecting the pressure level at which the overload high incompressible fluid pressure or overload low incompressible fluid pressure will close said valve.

10. The apparatus as defined in claim 2 wherein the first flexible member and the compliance members are constructed of a bellows shaped configuration the overload bellows and its associated movable portion of the overload valve are mounted by means of a retainer for movement on a wall of the meter that surrounds said bellows so that said bellows and overload valve can be readily disconnected therefrom.

11. The apparatus as defined in claim 2 wherein a flexible diaphragm is employed to act as a barrier between the relatively high and low incompressible fluids and associated high and low process fluids under measurement.

* * * * *